US012779456B2

(12) United States Patent
Chen et al.

(10) Patent No.: US 12,779,456 B2
(45) Date of Patent: Nov. 3, 2026

(54) ONE-STATION BIOMEDICAL MICRO-LABORATORY SYSTEM AND OPERATION METHOD THEREOF

(71) Applicant: GENE TARGET TECHNOLOGY CO., LTD., Kaohsiung City (TW)

(72) Inventors: Yi-Fang Chen, Kaohsiung City (TW); Suz-Kai Hsiung, Kaohsiung City (TW); Chun-Wei Huang, Kaohsiung City (TW); Yin-Lin Li, Kaohsiung City (TW); Kao-Yuan Chang, Kaohsiung City (TW)

(73) Assignee: GENE TARGET TECHNOLOGY CO., LTD., Kaohsiung City (TW)

( * ) Notice: Subject to any disclaimer, the term of this patent is extended or adjusted under 35 U.S.C. 154(b) by 422 days.

(21) Appl. No.: 18/398,783

(22) Filed: Dec. 28, 2023

(65) Prior Publication Data

US 2025/0177971 A1 Jun. 5, 2025

(30) Foreign Application Priority Data

Dec. 1, 2023 (TW) ................................ 112146853

(51) Int. Cl.
*B01L 3/00* (2006.01)

(52) U.S. Cl.
CPC ..... *B01L 3/5025* (2013.01); *B01L 2400/0409* (2013.01); *B01L 2400/043* (2013.01); *B01L 2400/0487* (2013.01)

(58) Field of Classification Search
None
See application file for complete search history.

(56) References Cited

U.S. PATENT DOCUMENTS

2021/0155978 A1* 5/2021 Tidd ...................... B01L 7/5255
2022/0333180 A1* 10/2022 Yang .................... C12Q 1/6804

FOREIGN PATENT DOCUMENTS

CN 112300911 A * 2/2021 ........... C12Q 1/6844
CN 114317230 A * 4/2022

* cited by examiner

*Primary Examiner* — P. Kathryn Wright
(74) *Attorney, Agent, or Firm* — Muncy, Geissler, Olds & Lowe, P.C.

(57) ABSTRACT

The invention provides a one-station biomedical micro-laboratory system comprising a first movable module, a multi-channel extraction module, an extraction amplification module, a second movable module, a chromogenic and image interception module, a rejection unit, a storage unit and a processing module. The operation method comprises a setting inspection procedure, a pre-operation procedure, an extraction procedure, an amplification procedure, a labeling procedure and a chromogenic and interpretation procedure. After the setting inspection procedure and the pre-operation procedure, the extraction procedure, the amplification procedure and the labeling procedure are performed on the extraction amplification module. Then the samples are extracted and delivered by the multi-channel extraction module to the chromogenic and image interception module to perform the chromogenic and interpretation procedure. The processing module stores the interpretation result of the sensing image, thereby achieving an automatic mode to perform relevant biomedical experiments, thereby reducing manual misjudgment and reducing work hours.

10 Claims, 7 Drawing Sheets

ONE-STATION BIOMEDICAL MICRO-LABORATORY SYSTEM AND OPERATION METHOD THEREOF

FIELD OF THE INVENTION

The present invention relates to a micro-experimental system and an operation method, and more particularly, to a one-station biomedical micro-laboratory system and an operation method thereof for automatically performing nucleic acid extraction, nucleic acid amplification and nucleic acid labeling and then placing a biochip on demand for analysis and interpretation.

BACKGROUND OF THE INVENTION

With the development of modern medical technology and clinical needs, many diagnostic methods or judgments gradually require quantitative analysis of target genes. However, when performing qualitative and quantitative analysis on the target genes, it is often desirable to increase the number of nucleic acid detection target objects in a relatively short period of time, so that a small number of nucleic acid detection target objects in a detection body can be increased to the number that can be detected. Thus, it facilitates the subsequent detection of the presence of nucleic acid detection target objects to be detected, and even it is hoped that the relevant procedures may be completed in the same laboratory, thereby reducing the waiting time for detection.

A user manually transmits the sample between the devices with different functions to perform a color reaction, not only damage may occur due to poor temperature control of the sample, but also unnecessary errors may occur during the manual operation. Also, when the sample is compared in chromogenic with the biochip, if the number of the sample is too large, manually performing the color comparison is prone to misjudge due to personnel exhaustion, or when the sample is manually extracted, the solution volume of the extracted sample is insufficient, resulting in the problem that the biochip cannot give chromogenic. It would be desirable to provide a method for automatically acquiring a solution volume of a desired liquid for color reaction with the biochip by performing relevant procedures on a sample, and automatically compare and interpret color images of the biochip, thereby ameliorating the disadvantages of manual manipulation and shortening the time consumed when different experiments requires different laboratories.

SUMMARY OF THE INVENTION

It is an object of the present invention to provide a one-station biomedical micro-laboratory system and an operation method thereof, which can automatically perform nucleic acid extraction, nucleic acid amplification or nucleic acid labeling on a sample and extract a desired solution volume of the sample to perform a color reaction with a biochip, thereby automatically comparing and interpreting a color image of the biochip.

In order to achieve the above object, the present invention provides a one-station biomedical micro-laboratory system, which comprises a first movable module, a multi-channel extraction module, an extraction amplification module, a second movable module, a chromogenic and image interception module, a rejection unit, a storage unit and a processing module; the first movable module comprises a first movable unit, a second movable unit and a third movable unit, wherein the first movable unit moves in a first direction; the second movable unit moves in a second direction; the third movable unit moves in a third direction; the first direction, the second direction and the third direction extend in different directions respectively and intersect with each other; the multi-channel extraction module comprises a multi-channel body, a plurality of extraction units, a plurality of extraction pipes and a plurality of conversion units, wherein the multi-channel body is assembled with at least one of the first movable unit, the second movable unit and the third movable unit; the multi-channel body accommodates the plurality of extraction units therein; one end of each of the extraction pipes is assembled with one of the extraction units, and the other end of each of the extraction pipes is assembled with one of the conversion units; the extraction amplification module comprises an extraction amplification bearing unit, a plurality of centrifuge tube bearing units, a plurality of first temperature control units and a first cover unit, wherein the extraction amplification bearing unit is provided with the first temperature control units and the first cover unit adjacent to one of the first temperature control units; the second movable module is assembled on a peripheral of the extraction amplification bearing unit and comprises a fourth movable unit and a clamping unit, wherein the fourth movable unit is located on the lower side of the extraction amplification bearing unit and has a fourth driver and a guide provided for sliding on the fourth driver; and the fourth driver is assembled with the clamping unit to clamp one of the centrifuge tube bearing units and move to a corresponding first temperature control unit; the chromogenic and image interception module comprises a plurality of shaking bearing units, a shaking driving unit, a second cover unit, an image interception unit and a plurality of reaction boxes, wherein the plurality of driving units are assembled with one side of the plurality of shaking bearing units, and the plurality of shaking driving units control one of the plurality of shaking bearing units to shake side-to-side; each of the plurality of shaking bearing units is recessed along an axial direction thereof to form a plurality of shaking bearing grooves in the plurality of bearing grooves are accommodated in the plurality of reaction boxes, the second cover unit and the image interception unit are respectively arranged at one side of the plurality of shaking bearing units, wherein the image interception unit comprises a fifth driver and an image sensor assembled with the fifth driver; the fifth driver controls movement of the image sensor in the first direction, the second direction and the third direction; the rejection unit is adjacent to the extraction amplification module and comprises a stop plate, a plurality of stop grooves formed on the stop plate and a collector arranged on the lower side of the stop plate; the storage unit which is adjacent to the rejection unit and has a plurality of storage grooves, wherein the storage unit having a plurality of storage grooves with different sizes; and the processing module is electrically connected to the first movable module, the first cover unit, the plurality of extraction units, the extraction amplification module, the plurality of first temperature control units, the second movable module, and the second cover unit and the image interception unit of the chromogenic and image interception module, respectively; wherein the processing module controls the first movable module to drive the multi-channel extraction module to move the biological samples to one of the extraction amplification module and the chromogenic and image interception module.

Further, the first movable unit comprises at least one first guide rod and at least one first driver on the first direction, the second movable unit moves comprises at least one second guide rod and at least one second driver on the second direction, the third movable unit moves comprises at least one third guide rod and at least one third driver on the third direction, and the first driver, the second driver and the third driver are electrically connected to the processing module. Further, each of the plurality of conversion units further comprises a combination part, a channel part and a conversion part, one end of the combination part is assembled at one end of each of the plurality of extraction pipes opposite to an other end of the plurality of extraction pipes assembled with each of the plurality of extraction units, the conversion part connected to the combination part is tapered towards the other end of the combination part in an axial direction, and the channel part is disposed of passing through each of the plurality of conversion units from one end of the combination part connected to each of the plurality of extraction pipes to one end of the conversion part opposite to the other end. Further, each of the plurality of centrifuge tube bearing units comprises a plurality of bearing through holes, and each of the plurality of first temperature control units comprising a plurality of temperature control grooves, and when one of the plurality of centrifuge tube bearing units is arranged on one of the plurality of first temperature control units, the plurality of bearing through holes of each of the plurality of centrifuge tube bearing units respectively correspond to the plurality of temperature control grooves of one of the plurality of first temperature control units.

Further, the clamping unit further comprises a clamping body, a clamping driver and two clamps, the clamping body and the clamping driver are respectively assembled on the guide, and the two clamps are provided for relatively sliding on each side of the clamping body.

Further, each of the plurality of shaking bearing units comprises a temperature control unit, and at least one waste liquid collection unit is arranged below the temperature control unit.

Further, a method for operating the one-station biomedical micro-laboratory system comprises a setting inspection procedure, inputting an inspection procedure to be performed on collected sample into the processing module; a pre-operation procedure, placing test reagents in centrifuge tubes accommodated in the plurality of storage grooves of the storage unit, respectively, and placing the biochips in the plurality of reaction boxes, and placing the collected samples in corresponding centrifuge tubes; an extraction procedure, controlling the multi-channel extraction module by the first movable module to move to a set centrifuge tube, and micropipettes assembled with the plurality of conversion units extracting the biological samples with required solution volume mixed with test reagents in the centrifuge tubes by the plurality of extraction pipes, placing the biological samples mixed with the test reagents in the centrifuge tubes accommodated by the plurality of centrifuge tube bearing units, and then controlling the clamping unit of the second movable module to respectively clamp the plurality of centrifuge tube bearing units to one of the plurality of first temperature control units, wherein the processing module moves the biological samples mixed with the test reagents in the centrifuge tubes sequentially between the plurality of first temperature control units with different temperatures; a labeling procedure, adding a labeling reagent into the centrifuge tubes completed in the extraction procedure, mixing a labeling reagent with extracted samples, and moving the labeling reagent mixed with the extracted samples sequentially between the plurality of first temperature control units with different temperatures; a chromogenic and interpretation procedure, driving the first movable module to control the multi-channel extraction module to move to the set centrifuge tube by the processing module, extracting the extracted samples completed in the labeling procedure with required solution volume in the set centrifuge tube by the micropipettes assembled with the plurality of conversion units by the plurality of extraction pipes, and transmitting the extracted samples completed in the labeling procedure to corresponding reaction boxes separately, and controlling the plurality of shaking driving units by the processing module to make the plurality of reaction boxes shake the plurality of shaking bearing units accommodated, reacting the biochips with the samples for chromogenic in the plurality of reaction boxes, controlling the fifth driver of the image interception module by the processing module to move the image sensor to sense, compare and interpret on chromogenic biochips one to one, and storing an interpretation result by the processing module; wherein the processing module enables the one-station biomedical micro-laboratory system to perform the extraction procedure first and then the labeling procedure in sequence; and wherein the processing module enables the micropipettes assembled by the plurality of conversion units to be eliminated at the rejection unit.

Further, the method comprises an amplification procedure after the extraction procedure that the processing module adds the test reagents containing a polymerase and a primer to the centrifuge tubes on the plurality of centrifuge tube bearing units which have completed an extraction, and sequentially moves the centrifuge tubes in which the test reagents mixed with the polymerase and the primer and the extracted samples are mixed between the first temperature control units with different temperatures, so that the samples completes an amplification.

Further, the method comprises performing the amplification procedure by firstly adding the test reagent containing the polymerase to the centrifuge tube and then adding the test reagent containing the primer to the centrifuge tube.

Further, one of the plurality of first temperature control units is further provided with a magnetic field unit; the centrifuge tubes accommodated on the plurality of centrifuge tube bearing units are filled with a test reagent containing magnetic beads; and the biological sample is extracted by the magnetic bead contained in the test reagent in the first temperature control unit containing the magnetic field unit during the extraction procedure.

According to the one-station biomedical micro-laboratory system and the operation method thereof of the present invention, the first movable module is controlled by the processing module, so that the first movable unit, the second movable unit and the third movable unit move the multi-channel extraction module to a designated position to perform the extraction procedure, the amplification procedure and the labeling procedure which are followed by the chromogenic and interpretation procedure. The sample extraction is performed by the extraction units by tightly fitting a micropipette corresponding to a required solution volume to the extraction pipes assembled and the conversion units assembled at the other ends of the extraction pipes respectively. The sample extracted by the micropipette is displaced into the centrifuge tubes accommodated by the centrifuge tube bearing units of the extraction amplification module. The processing module controls the extraction amplification module to perform nucleic acid extraction, nucleic acid amplification or nucleic acid labeling on the centrifuge tubes accommodated by the centrifuge tube bearing units. After that, the sample in the centrifuge tube is then moved to the chromogenic and image interception module to make the sample react with the biochip. Then the image interception unit performs image interception on the chromogenic result of the reaction between the biochip and the sample. The intercepted image data are compared and analyzed and interpreted, so that not only the artificial misjudgment may be reduced but also the working hours may be reduced.

DETAILED DESCRIPTION OF THE PREFERRED EMBODIMENTS

Figure 1:
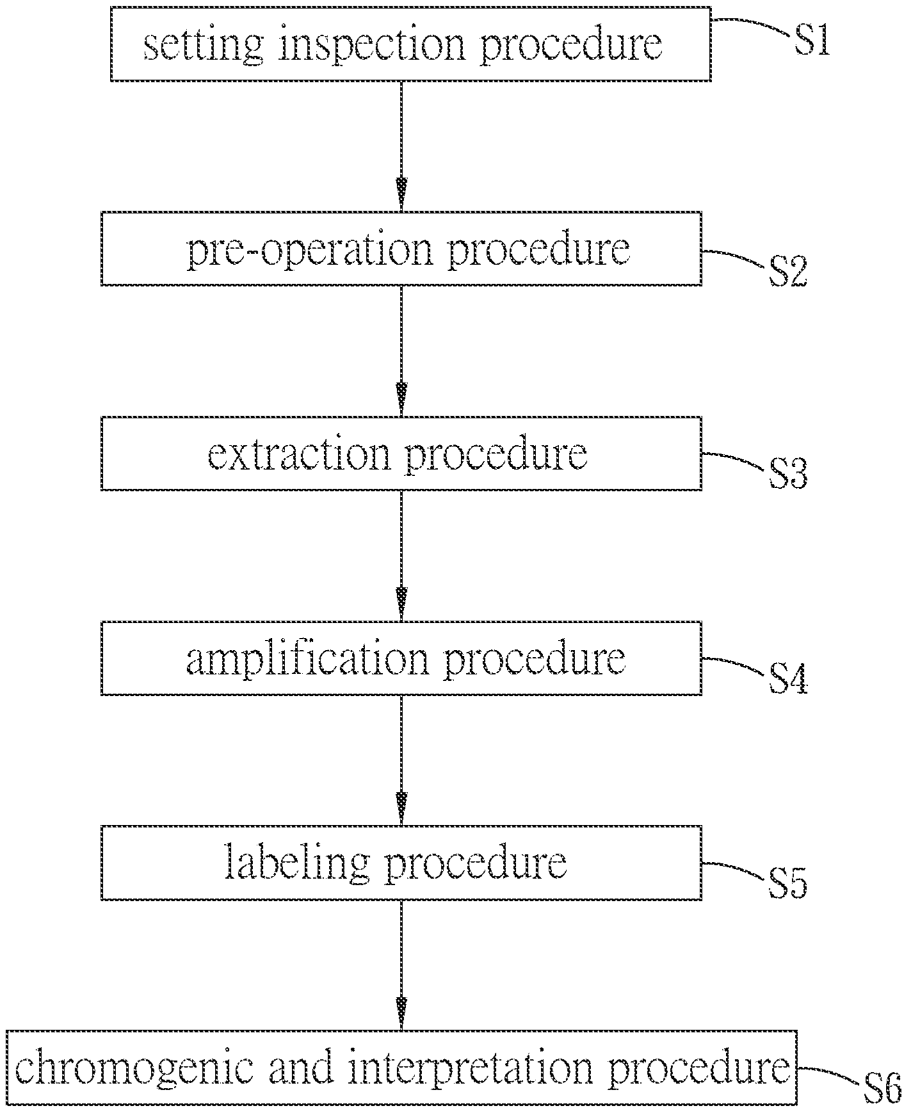
FIG. 1 is a schematic operational flow diagram of a one-station biomedical micro-laboratory system and an operation method thereof of the present invention.

The technical features and the mode of operation of this application are described below by giving preferred embodiments, together with accompanying drawings, in order for examination and reference. Furthermore, the drawings in the present invention are not necessarily to scale for ease of illustration. The scale in the drawings is not intended to limit the scope of the present disclosure.

With regard to the technology of the present invention, as shown in FIG. 1, FIG. 2, FIG. 3, FIG. 4, FIG. 5, FIG. 6, and FIG. 7, and the present invention provides a one-station biomedical micro-laboratory system and an operation method thereof for automatically performing nucleic acid extraction, nucleic acid amplification, nucleic acid labeling on samples, quantitative and qualitative analysis and interpretation on biological samples. As shown in FIG. 3, FIG. 4, FIG. 5, and FIG. 6, the one-station biomedical micro-laboratory system mainly includes a first movable module 10, a multi-channel extraction module 20, an extraction amplification module 30, a second movable module 40, a chromogenic and image interception module 50, a rejection unit 60, a storage unit 70 and a processing module 80.

The first movable module 10 comprises a first movable unit 11 moving in a first direction X, a second movable unit 12 moving in the second direction Y, and a third movable unit 13 moving in a third direction Z. In one embodiment, the first movable unit 11 comprises two first guide rods 111 and two first drivers 112. The second movable unit 12 comprises two second guide rods 121 and two second drivers 122. The third movable unit 13 comprises two third guide rods 131 and two third drivers 132. The first direction X, the second direction Y and the third direction Z extend in different directions respectively and intersect with each other.

Figure 7:
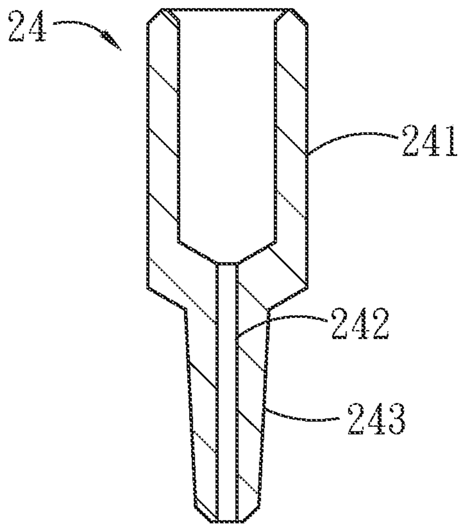
FIG. 7 is a schematic cross-sectional view of a conversion unit of the one-station biomedical micro-laboratory system of the present invention.

The multi-channel extraction module 20 comprises a multi-channel body 21, a plurality of extraction units 22, a plurality of extraction pipes 23 and a plurality of conversion units 24. The multi-channel body 21 is assembled with at least one of the first movable unit 11, the second movable unit 12, and the third movable unit 13. In one embodiment, the multi-channel body 21 is assembled with the first movable unit 11 and the third movable unit 13. The multi-channel body 21 accommodates the plurality of extraction units 22 therein. One end of each of the plurality of extraction pipes 23 is assembled with one of the plurality of extraction units 22. The other end of each of the plurality of extraction pipes 23 is assembled with one of the plurality of conversion units 24. As shown in FIG. 7, each of the plurality of conversion units 24 comprises a combination part 241, a channel part 242, and a conversion part 243. One end of the combination part 241 is assembled at the other end of the extraction pipe 23 opposite to the end assembled with the extraction unit 22. One end of the conversion part 243 connected to the combination part 241 is tapered towards the other end of the combination part 241 in an axial direction, and different sizes of the conversion parts 243 are in combination with different volumes of micropipettes 200. In one embodiment, the plurality of conversion units 24 are provided with three sizes of conversion parts 243. The channel part 242 is disposed to pass through the conversion units 24 from one end of the combination part 241 connected to the extraction pipe 23 to one end of the conversion part 243 opposite to that. The plurality of extraction units 22 may be pneumatic cylinders or hydraulic cylinders for micropipettes 200 assembled by the conversion parts 243 to carry out actions of suction and release, and the other end of the plurality of extraction pipes 23 may be arranged, as required, with the conversion parts 243 of the plurality of conversion units 24 in different sizes. Alternatively, all of the conversion parts 243 of the plurality of conversion units 24 can be used in the same sizes, but is not limited thereto.

The extraction amplification module 30 comprises an extraction amplification bearing unit 31, a plurality of centrifuge tube bearing units 32, a plurality of first temperature control units 33, a magnetic field unit 34 and a first cover unit 35. Refer back to FIG. 1, FIG. 2 and FIG. 4, the extraction amplification bearing unit 31 is provided with the plurality of first temperature control units 33 and the first cover unit 35, and the first cover unit 35 is arranged on one of the plurality of first temperature control units 33. Each of the plurality of centrifuge tube bearing units 32 comprises a plurality of bearing through holes 321. Each of the plurality of first temperature control units 33 is provided with a plurality of temperature control grooves 331. When one of the plurality of centrifuge tube bearing units 32 is arranged on one of the plurality of first temperature control units 33, the plurality of bearing through holes 321 of the centrifuge tube bearing unit 32 respectively correspond to the plurality of temperature control grooves 331 of the first temperature control unit 33. The magnetic field unit 34 is arranged on a peripheral of one of the plurality of first temperature control units 33 so as to provide a magnetic field required for the biological samples to perform the magnetic sphere bead extraction reaction. In addition, when the plurality of first temperature control units 33 maintain a higher temperature, the first cover unit 35 may be controlled to cover the plurality of first temperature control units 33 so as to avoid vapor generated by the liquid in a centrifuge tube 300 from evaporation due to the high temperature. Also, each of the plurality of first temperature control units 33 is in different temperatures, and the sample is able to reach a temperature set by the plurality of first temperature control units 33.

The second movable module 40 is assembled on a peripheral of the extraction amplification bearing unit 31, and comprises a fourth movable unit 41 and a clamping unit 42. The fourth movable unit 41 is assembled with the clamping unit 42 and located on a lower side of the extraction amplification bearing unit 31 to provide with a fourth driver 411 and a guide 412. The guide 412 is provided for sliding on the fourth driver 411 and is assembled with the clamping unit 42. The clamping unit 42 clamps and moves the plurality of centrifuge tube bearing unit 32 to one of the corresponding first temperature control units 33 by the fourth movable unit 41. In one embodiment, the fourth driver 411 is a linear sliding rail, but is not limited thereto. The clamping unit 42 comprises a clamping body 421, a clamping driver 422, and two clamps 423. The clamping body 421 and the clamping driver 422 are respectively arranged on the guide 412. The two clamps 423 are slidably mounted on the clamping body 421 and slide in opposite directions along one side of the clamping body 421. The two clamps 423 protruding from ends of the plurality of first temperature control units 33 are controlled to clamp the plurality of centrifuge tube bearing units 32 to move along the second direction Y.

Figure 2:
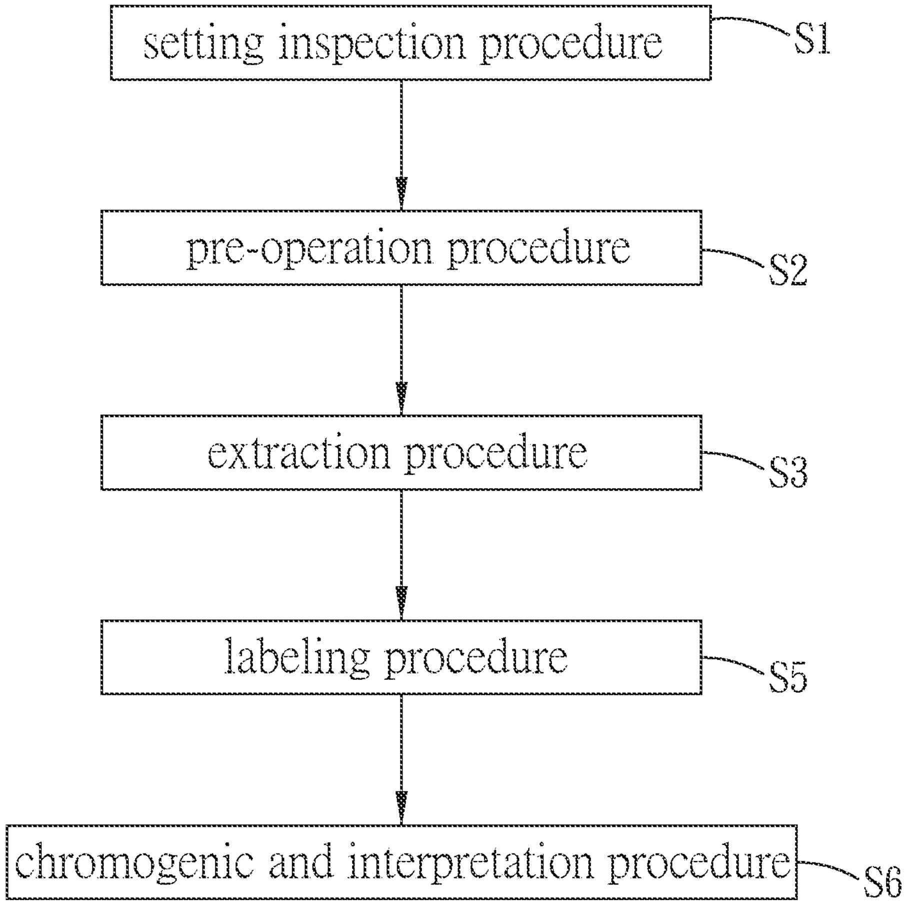
FIG. 2 is a schematic operational flow diagram of another embodiment of the one-station biomedical micro-laboratory system and the operation method thereof of the present invention.
Figure 3:
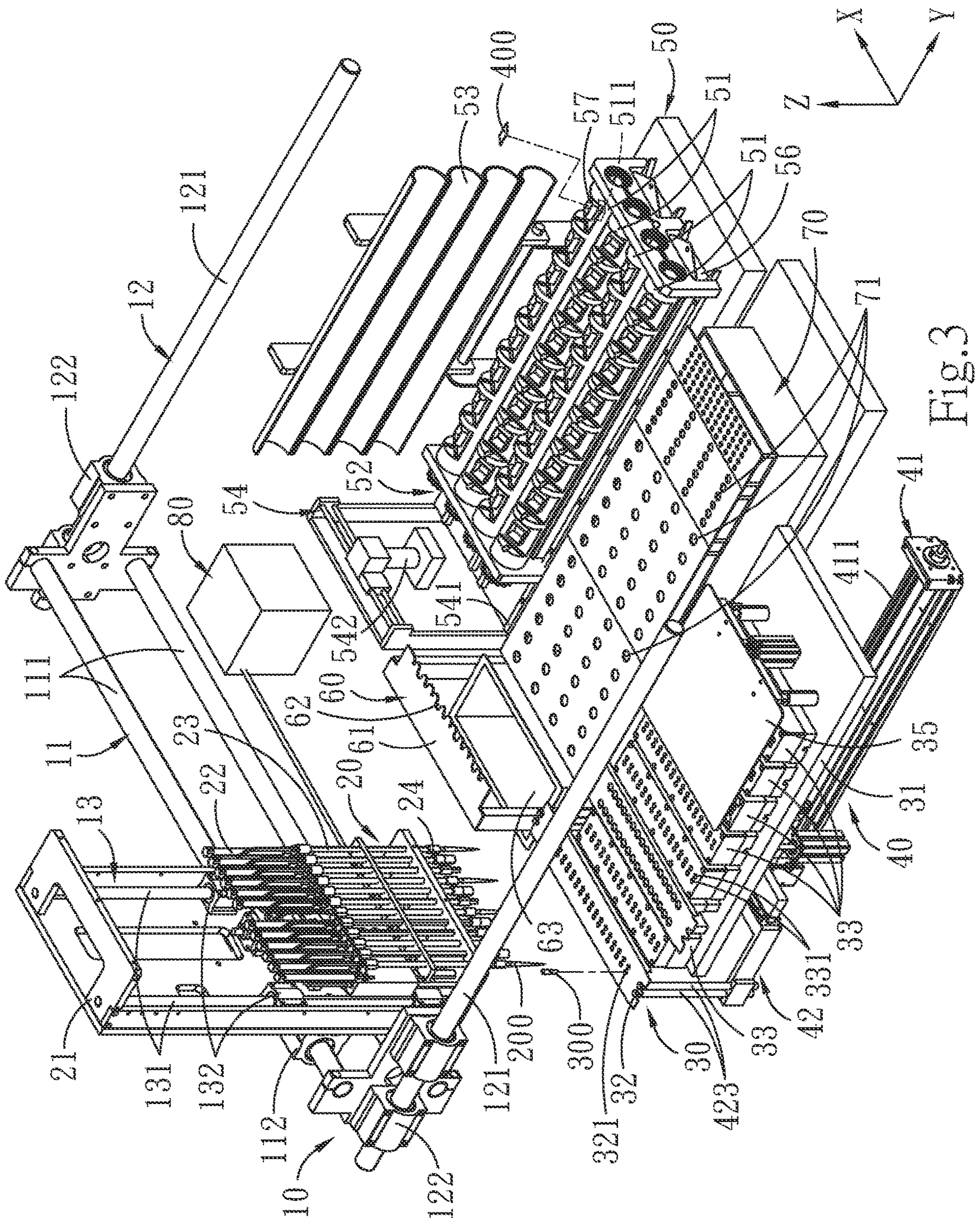
FIG. 3 is a schematic perspective view of a one-station biomedical micro-laboratory system of the present invention.
Figure 4:
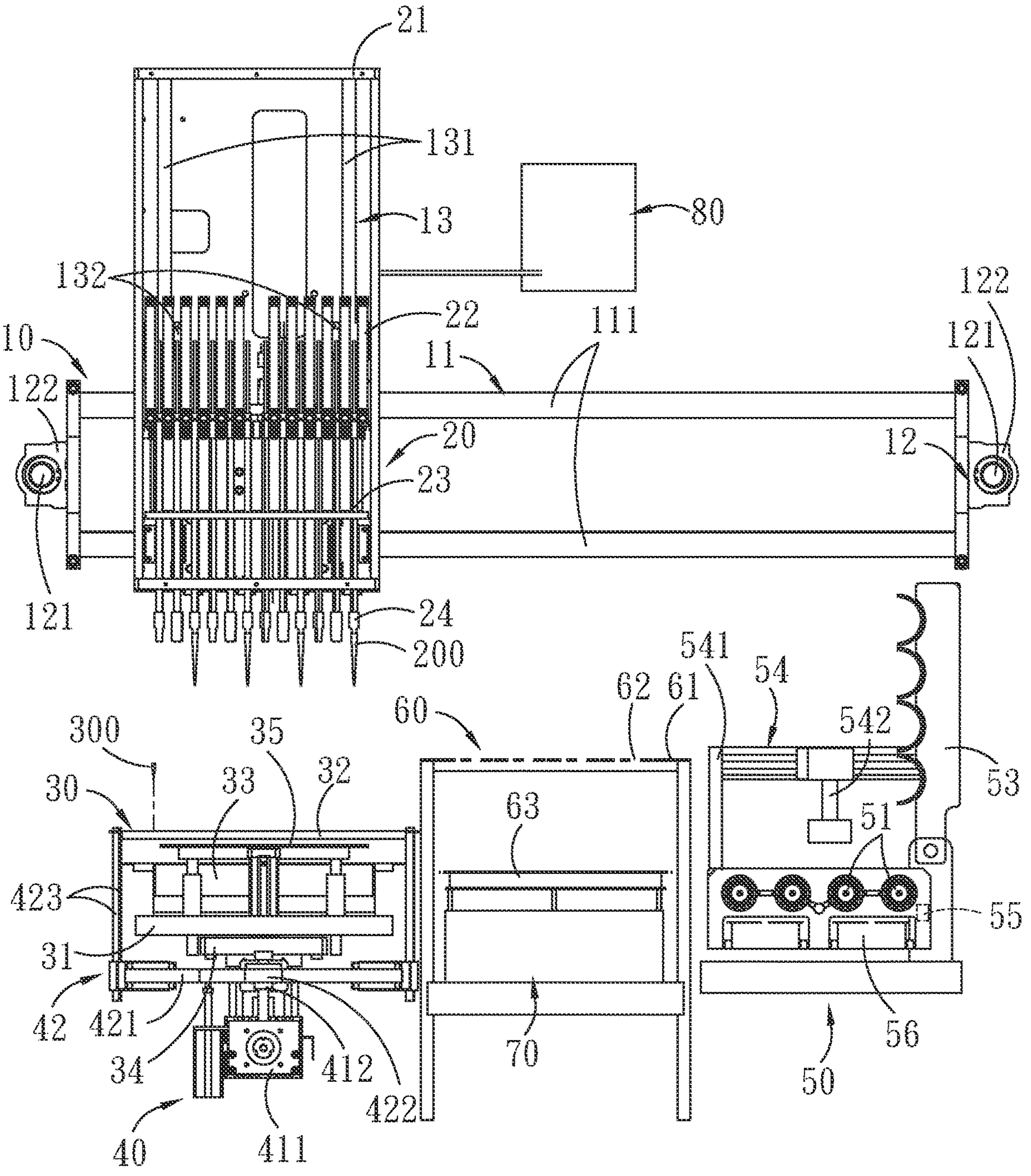
FIG. 4 is a schematic side view of a one-station biomedical micro-laboratory system of the present invention.
Figure 5:
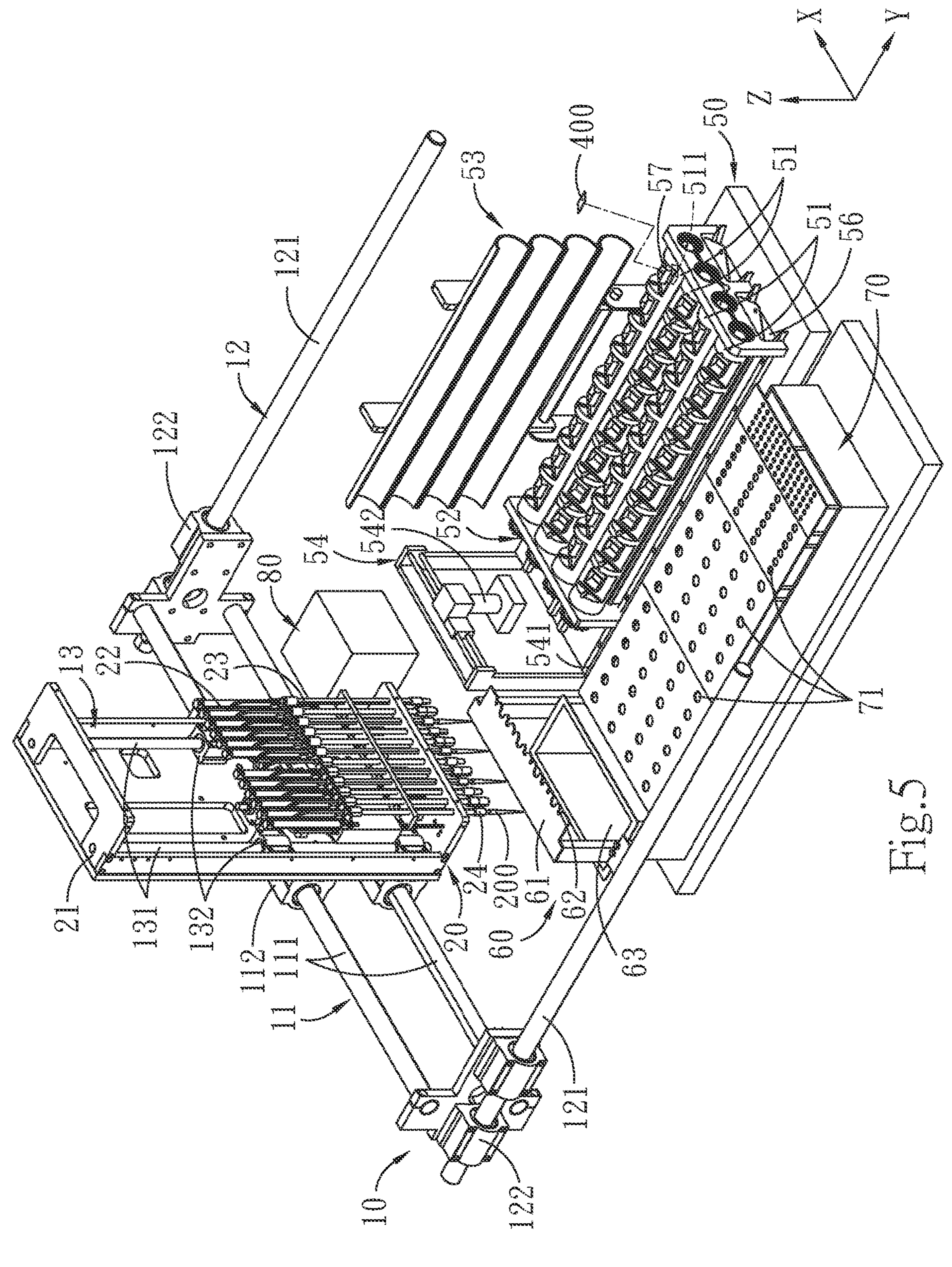
FIG. 5 is a partial perspective view of a chromogenic and image interception module, a rejection unit and a storage unit of the one-station biomedical micro-laboratory system of the present invention.
Figure 6:
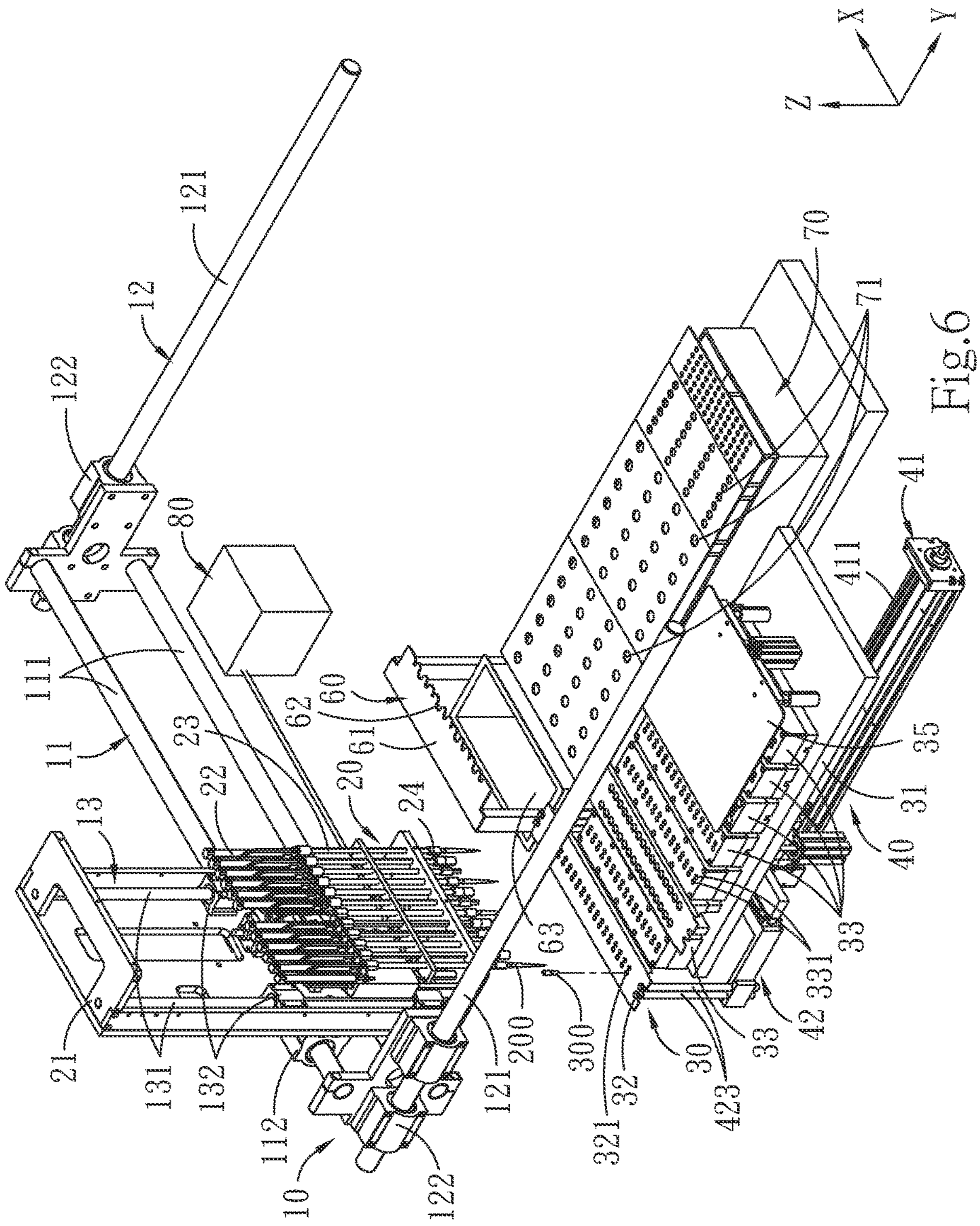
FIG. 6 is a partially schematic perspective view of an extraction amplification module, a rejection unit and a storage unit of the one-station biomedical micro-laboratory system of the present invention.

The chromogenic and image interception module 50 comprises a plurality of shaking bearing units 51, a plurality of shaking driving units 52, a second cover unit 53, an image interception unit 54, a plurality of second temperature control units 55, a plurality of waste liquid collection units 56 and a plurality of reaction boxes 57. Refer to FIG. 1, FIG. 2, and FIG. 3 again, the plurality of shaking driving units 52 are assembled with one side of the plurality of shaking bearing units 51, and the plurality of shaking driving units 52 controls the plurality of shaking bearing units 51 to shake side-to-side, and each of the plurality of shaking bearing units 51 is recessed along an axial direction thereof to form a plurality of bearing grooves 511. The second cover unit 53 and the image interception unit 54 are respectively arranged on one side of the plurality of shaking bearing units 51, and the plurality of shaking bearing units 51 are respectively provided with one of the plurality of second temperature control units 55. In one embodiment, the plurality of waste liquid collection units 56 are arranged below the plurality of second temperature control units 55. In other embodiment, one waste liquid collection unit 56 is provided under below the plurality of second temperature control units 55. The waste liquid collection unit 56 is used to collect the solutions with unused biological samples in the centrifuge tubes 300 accommodated in the plurality of bearing grooves 511 of the shaking bearing units 51. The image interception unit 54 comprises a fifth driver 541 and an image sensor 542, and the fifth driver 541 controls the image sensor 542 arranged to move along an axial direction of the plurality of shaking bearing units 51, namely, towards the second direction Y. The image sensor 542 may also move along the first direction X or the third direction Z according to requirements, so that the image sensor 542 perform image sensing on a one-to-one basis on biochips 400 presenting chromogenic in each reaction box 57. In one embodiment, the image sensor 542 is a Charge-coupled Device (CCD) sensing units or optical sensing units, etc. The user may set the image sensor 542 required to sense general images, sense images with specific wavelengths, or sense chromogenic images with specific chromogenic in demand, so that chromogenic images of the biochips 400 can be sensed by wavelengths such as fluorescence or luminescence, but is not limited thereto.

The rejection unit 60 is adjacent to the extraction amplification module 30. The rejection unit 60 comprises a stop plate 61 and a plurality of stop grooves 62 formed on the stop plate 61. The rejection unit 60 is provided with a collector 63 on a lower side of the stop plate 61.

The storage unit 70 is adjacent to the rejection unit 60. The storage unit 70 comprises a plurality of storage grooves 71 with different sizes. In one embodiment, the plurality of storage grooves 71 have three sizes, so as to store three types of micropipettes 200 and three types of centrifuge tubes 300 used to contain different solution volumes of extracted samples of different solution volumes.

The processing module 80 is electrically connected to the two first drivers 112, the two second drivers 122, the two third drivers 132 of the first movable module 10, the plurality of extraction units 22 of the multi-channel extraction module 20, the plurality of centrifuge tube bearing units 32 of the extraction amplification module 30, the plurality of first temperature control units 33, the first cover unit 35, the fourth driver 411 of the second movable module 40, the clamping driver 422, the plurality of shaking driving units 52 of the chromogenic and image interception module 50, the fifth driver 541, the image sensor 542, the second cover unit 53 and the plurality of second temperature control units 55. In addition, the processing module 80 transmits the chromogenic images of the biochips 400 intercepted by the image sensor 542 to a cloud database via the Internet, and then the cloud database provides the chromogenic images of the biochips 400 sensed and intercepted to a relevant servo computer for comparing with a stored chromogenic image data of a corresponding standards, and a comparison result is stored in the cloud database for subsequent processing.

The processing module 80 controls the first movable module 10 to drive the multi-channel extraction module 20 to move the samples to one of the extraction amplification module 30 and the chromogenic and image interception module 50.

Referring to FIG. 1, the present invention provides a method for operating the above-described one-station biomedical micro-laboratory system as follows:

a setting inspection procedure S1: inputting an inspection procedure to be performed on collected samples into the processing module 80.

a pre-operation procedure S2: placing test reagents in centrifuge tubes 300 accommodated in the plurality of storage grooves 71 of the storage unit 70 respectively, and placing the biochips 400 in the plurality of reaction boxes 57, and placing the collected samples in corresponding centrifuge tubes 300, respectively. The test reagents used in different procedures are respectively accommodated in the centrifuge tubes 300 of the storage unit 70 one by one, so as to provide the test reagents required in different procedures to react with the samples. The test reagents are generally provided as a test reagent for cell lysis, a test reagent containing magnetic beads for magnetic bead extraction, a test reagent with different components for washing, a test reagent for pH adjustment or elution, a test reagent containing a polymerase or a primer, a labeling reagent for nucleic acid labeling, a test reagent for hybridization reaction with the biochips 400, a test reagent for blocking reaction of the biochips 400, a test reagent for chromogenic reaction of the biochips 400, and a test reagent for termination reaction of the biochips 400;

that is, the test reagents required for various reactions of the samples and the biochips 400 are first placed in the centrifuge tubes 300 of the plurality of storage grooves 71 of the storage unit 70, so as to ensure that appropriate test reagents may be used for reactions at different stages, but the test reagents used are not limited thereby.

an extraction procedure S3: controlling the multi-channel extraction module 20 by the first movable module 10 to move to the preset centrifuge tubes 300, and the micropipettes 200 assembled with the plurality of conversion units 24 extract samples with required solution volume mixed with test reagents in the centrifuge tubes 300 by the plurality of extraction pipes 23. In this embodiment, a test reagent for cell lysis is firstly used, and the samples in the micropipettes 200 mixed with the test reagent for cell lysis are placed in the centrifuge tubes 300 accommodated by the plurality of centrifuge tube bearing units 32; then the clamping unit 42 of the second movable module 40 is controlled to clamp the plurality of centrifuge tube bearing units 32 to one of the plurality of first temperature control units 33. The centrifuge tubes 300 on the plurality of centrifuge tube bearing units 32 may be filled with a test reagent containing magnetic beads, and the test reagent containing the magnetic beads mixed with the samples are performed with magnetic bead extraction in the plurality of first temperature control unit 33 containing the magnetic field unit 34 in the extraction procedure S3, and test reagents of different compositions used for washing can be used to wash the samples extracted with the magnetic beads in sequence; after completing a magnetic bead extraction, the samples mixed with the test reagent containing magnetic beads in the centrifuge tubes 300 are sequentially moved between the plurality of first temperature control units 33 with different temperatures by the processing module 80, and the nucleic acid is washed and eluted by collocating with the test reagent to extract required thereof.

an amplification procedure S4: making the centrifuge tubes 300 on the plurality of centrifuge tube bearing units 32 completed in the extraction procedure S3 to be filled with the test reagent containing polymerase by the processing module 80; in this embodiment, the test reagent containing polymerase is added to the nucleic acid extracted from the samples for amplification, and then the test reagent containing the primer is added to the centrifuge tubes 300; mixing the test reagent containing the polymerase with the test reagent containing the primer and an extracted sample in the centrifuge tubes 300 are sequentially moved between the plurality of first temperature control units 33 with different temperatures, so that the amplification procedure S4 is completed. With reference to FIG. 2, another embodiment of the operation method of the present invention, when an amount of nucleic acid extracted from the samples in the extraction procedure S3 is sufficient, the samples may not need to perform the amplification procedure S4, and remaining procedures of another embodiment are the same as the operation method of this embodiment and will not be described in detail.

a labeling procedure S5: referring to FIG. 1, adding a labeling reagent into the centrifuge tubes 300 completed in the extraction procedure S3, or the centrifuge tubes 300 completed in both the extraction procedure S3 and the amplification procedure S4, mixing the labeling reagent with the samples in the centrifuge tubes 300, and the mixture of the labeling reagent and the extracted samples in the centrifuge tubes 300 are sequentially moved between the plurality of first temperature control units 33 with different temperatures so as to complete the labeling procedure S5 for the nucleic acid of the samples;

a chromogenic and interpretation procedure S6: driving the first movable module 10 to control the multi-channel extraction module 20 to move to the preset centrifuge tubes 300 by the processing module 80, the micropipettes 200 assembled with the plurality of conversion units 24 extract the samples with required solution volume in the centrifuge tubes 300 completed in the labeling procedure S5 by the plurality of extraction pipes 23, and the extracted samples are transmitted to corresponding reaction boxes 57 one-to-one and a test reagent for hybridization reaction required are added therein, thereby performing a hybridization reaction with the samples and the test reagent for hybridization reaction in the reaction boxes 57. That is, the test reagent and a reaction temperature applied in the chromogenic and interpretation procedure S6 are determined according to the biochips 400 used to perform the hybridization reaction. After the hybridization reaction, a washing step is performed to remove a part of the biochips on which the hybridization reaction does not occur and block remaining holes in the biochips. In this embodiment, the test reagent for hybridization reaction is sequentially added to perform the hybridization reaction on the nucleic acid of the samples and the biochips, and washing reagent is added to wash and block the remaining holes. The processing module 80 controls the plurality of shaking driving units 52 to make the plurality of reaction boxes 57 shake the plurality of shaking bearing units 51 accommodated, so as to provide the reaction temperature required for the biochips 400 in the plurality of reaction boxes 57 and the nucleic acid of the samples to perform a reaction uniformly. Then, controlling a test reagent for chromogenic reaction to be added in the plurality of reaction boxes 57 by the processing module 80, and shaking the plurality of shaking bearing units 51 by the plurality of shaking driving units 52 to uniformly perform a chromogenic reaction between the nucleic acid on the biochips 400 and the test reagent for chromogenic reaction. After the chromogenic reaction is completed, a termination reagent is added to stop the chromogenic reaction. In this embodiment, the test reagent for chromogenic reaction is firstly added and mixed with the samples in the plurality of reaction boxes 57 to perform the chromogenic reaction, and after the chromogenic reaction is completed, the test reagent for termination reaction is added to stop the chromogenic reaction; the processing module 80 controls the fifth driver 541 of the image interception unit 54 to move the image sensor 542 to sense, compare and interpret chromogenic biochips 400 one-to-one, the processing module 80 stores an interpretation result. In this embodiment, the processing module 80 transmits the chromogenic images of the biochips 400 sensed and intercepted by the image sensor 542 to a cloud database via the Internet, and then the cloud database provides the chromogenic images of the biochips sensed and intercepted to a relevant servo computer for comparing with a chromogenic image data of corresponding standards stored, and a comparison result is stored in the cloud database for subsequent processing.

The samples are controlled to be performed in the extraction procedure S3, the amplification procedure S4 and the labeling procedure S5 in sequence by the processing module 80, and the micropipettes 200 assembled with the plurality of conversion units 24 are controlled to be rejected at the rejection unit 60 by the processing module 80; the processing module 80 adjusts and selects the extraction procedure S3, the amplification procedure S4 and the labeling procedure S5 required according to requirements of the samples, but is not limited to the above-mentioned experimental steps.

Referring again to FIG. 1, FIG. 2, FIG. 3, FIG. 4, and FIG. 5, a user places the samples to be inspected in the centrifuge tubes 300 and adds solvent and test reagents required, and places the biochips 400 in the plurality of reaction boxes 57 to complete the pre-operation procedure S2, and inputs an inspection comparison program data for inspection and comparison in the processing module 80 to perform subsequent procedures according to the inspection and comparison program data inputted to complete setting the setting inspection procedure S1. That is, when the samples in the centrifuge tubes 300 are to be performed to nucleic acid extraction, nucleic acid amplification or nucleic acid labeling, the processing module 80 first completes the setting inspection procedure S1 and the pre-operation procedure S2, but is not limited to sequences thereof. Then the extraction procedure S3 is performed. The plurality of extraction units 22 is controlled by the processing module 80 to extract the samples with required solution volume in the centrifuge tubes 300 of the plurality of storage grooves 71 of the storage unit 70, and then the samples of required solution volume is transmitted from the first movable module 10 to the centrifuge tubes 300 of the plurality of bearing through holes 321 of one of the plurality of centrifuge tube bearing units 32 of the extraction amplification module 30. The fourth driver 411 of the fourth movable unit 41 of the second movable module 40 controls the clamping unit 42, so that the two clamps 423 of the clamping unit 42 clamp one of the plurality of centrifuge tube bearing units 32, and the centrifuge tubes 300 placed in the plurality of bearing through holes 321 of one of the plurality of centrifuge tube bearing units 32 are accommodated in one of the plurality of first temperature control unit 33 with specific temperature, or is placed in one of the plurality of first temperature control units 33 with the magnetic field unit 34. The test reagents required are added in the samples in the centrifuge tubes 300 in sequence, and temperatures and times required are provided by one of the plurality of first temperature control units 33, and suction and mixing are performed in the micropipettes 200 in the centrifuge tubes 300 by the plurality of extraction units 22. Also, the magnetic bead extraction is performed on one of the plurality of first temperature control units 33 with the magnetic field unit 34 according to requirements, and the amplification procedure S4 and the labeling procedure S5 are performed according to requirements after the samples completing the extraction procedure S3. The user may perform the amplification procedure S4 and then the labeling procedure S5 after the extraction procedure S3 is completed.

When the samples in the centrifuge tubes 300 complete the labeling procedure S5, the chromogenic and interpretation procedure S6 is then performed, so that the samples in the centrifuge tubes 300 react with the biochips 400 to be analyzed enhanced features thereof. At this moment, the processing module 80 controls the samples in the centrifuge tubes 300 to be transmitted from the first movable module 10 and the multi-channel extraction module 20 to the plurality of reaction boxes 57 of the chromogenic and image interception module 50, so that the samples react with the biochips 400 in the plurality of reaction boxes 57 with corresponding test reagents in a chromogenic manner. The processing module 80 controls the fifth driver 541 of the image interception module 54 to move the image sensor 542 to sense, compare and interpret on the chromogenic biochips 400 one-to-one, and the processing module 80 stores interpretation results. In one embodiment, the processing module 80 transmits the chromogenic images of the biochips 400 sensed and intercepted by the image sensor 542 to a cloud database via the Internet, and then the cloud database provides the chromogenic images of the biochips sensed and intercepted to a relevant servo computer for comparing with the chromogenic image data of the corresponding standards stored, and the comparison result is stored in the cloud database for subsequent processing.

In detail, the processing module 80 controls to perform nucleic acid extraction, nucleic acid amplification or nucleic acid labeling on the samples mixed with the test reagent in the centrifuge tubes 300 at the extraction amplification module 30, and the centrifuge tubes 300 are placed on the plurality of centrifuge tube bearing units 32. Therefore, the fourth driver 411 of the fourth movable unit 41 of the second movable module 40 moves the clamping body 421 of the clamping unit 42 to one of the plurality of centrifuge tube bearing units 32 to be clamped. The clamping driver 422 drives the two clamps 423 to slide toward each other to clamp one of the plurality of centrifuge tube bearing units 32. The plurality of centrifuge tube bearing units 32 are sequentially moved to the plurality of first temperature control units 33 with specific reaction temperatures, and centrifuge tubes 300 are placed into the plurality of temperature control grooves 331 one-to-one. The processing module 80 controls the plurality of first temperature control units 33 to reach the reaction temperature required. When the reaction temperature is high, the processing module 80 covers the first cover unit 35 on the plurality of temperature control grooves 331. The magnetic bead extraction can be performed by placing the test reagent containing magnetic beads in the magnetic field unit 34 and the centrifuge tubes 300. When a required reaction of the samples in the centrifuge tubes 300 is completed, the processing module 80 controls the first movable module 10 to move the multi-channel extraction module 20 to a designated position by the two first drivers 112 of the first movable unit 11, the two second drivers 122 of the second movable unit 12 and the two third drivers 132 of the third movable unit 13, wherein the processing module 80 selects a size of a micropipette 200 at the storage unit 70 corresponding to the samples with solution volume required by inspection, and the plurality of extraction units 22 are controlled to move the plurality of extraction pipes 23 along the third direction Z. The conversion parts 243 of the plurality of conversion units 24 assembled with the plurality of extraction pipes 23 are tightly fitted to selected micropipettes 200 one by one, and then the multi-channel body 21 is moved to drive the plurality of extraction units 22 moving to positions of corresponding centrifuge tubes 300, so that the plurality of extraction units 22 extract the samples in the corresponding centrifuge tubes 300. When the plurality of extraction units 22 perform extraction, and air in the micropipettes 200 passes along the channel part 242 to the extraction pipe 23 of each of the plurality of conversion units 24 by principles of vacuum, and the samples with required solution volume are extracted from the centrifuge tubes 300 by the micropipettes 200, and the samples extracted by the micropipettes 200 are displaced into the reaction boxes 57 of the plurality of shaking bearing units 51 of the chromogenic and image interception module 50.

Furthermore, the multi-channel extraction module 20 rejects used micropipettes 200 through the rejection unit 60, namely, the used micropipettes 200 tightly fitted to the conversion parts 243 are clamped against one of the plurality of stop grooves 62 corresponded on the stop plate 61, and then the plurality of extraction units 22 are moved in the third direction Z, so that the micropipette 200 is removed from the plurality of conversion parts 243 tightly fitted, and the used micropipettes 200 fall into the collector 63 provided below. Furthermore, the processing module 80 controls the shaking driving unit 52 of the analysis and image interception module 50, wherein the shaking driving unit 52 drives the plurality of shaking bearing units 51 shaking side-to-side and makes the plurality of second temperature control units 55 provide temperatures required by the plurality of shaking bearing units 51, and the fifth driver 541 of the image interception unit 54 moves along the second direction Y so that the image sensor 542 senses and intercepts the chromogenic images of the biochips one by one, after a reaction between the samples and the biochips 400 placed in the reaction boxes 57 by the plurality of shaking bearing units 51 is completed, and the processing module 80 interprets chromogenic results received. Thus, the one-station biomedical micro-laboratory system of the present invention performs inspection and interpretation procedures in an automated manner, reducing the trouble of human inspection and inaccurate interpretation.

In view of the above, according to the one-station biomedical micro-laboratory system and the operation method thereof of the present invention, the setting inspection procedure S1 is firstly performed. The first movable module 10 is controlled by the processing module 80, so that the first movable unit 11, the second movable unit 12 and the third movable unit 13 move the multi-channel extraction module 20 to a designated position to perform the extraction procedure S3, the amplification procedure S4, the labeling procedure S5, and the chromogenic and interpretation procedure S6. The samples are extracted by the micropipette 200 matched with required solution volume that is tightly fitted to the plurality of extraction pipes 23 and assembled with the plurality of conversion units 24, assembled with the other ends of the plurality of extraction pipes 23, respectively. The samples extracted by the micropipette 200 are displaced into the centrifuge tubes 300 accommodated by the plurality of centrifuge tube bearing units 32 of the extraction amplification module 30. The processing module 80 controls the plurality of extraction amplification module 30 to perform nucleic acid extraction, nucleic acid amplification or nucleic acid labeling on the centrifuge tubes 300 accommodated by the plurality of centrifuge tube bearing units 32. After that, the samples in the centrifuge tubes 300 are moved to the chromogenic and image interception module 50 to react with the biochips 400, and the image interception unit 54 performs image interception on the chromogenic results of the reaction between the biochips 400 and the samples, to compare, analyze, and interpret, so that not only the artificial misjudgment may be reduced but also the working hours may be reduced.

What is claimed is:

1. A one-station biomedical micro-laboratory system, provided for nucleic acid extraction, amplification, labeling, quantitative and qualitative analysis and interpretation of biological samples in an automated manner, comprising:

a first movable module, comprising a first movable unit, a second movable unit and a third movable unit, wherein the first movable unit moves in a first direction; the second movable unit moves in a second direction; the third movable unit moves in a third direction; the first direction, the second direction and the third direction extending in different directions respectively and intersecting with each other;

a multi-channel extraction module, comprising a multichannel body, a plurality of extraction units, a plurality of extraction pipes, and a plurality of conversion units, wherein the multi-channel body is assembled with at least one of the first movable unit, the second movable unit, and the third movable unit; the multi-channel body accommodating the plurality of extraction units therein, one end of each of the plurality of extraction pipes assembled with one of the extraction units, and an other end of each of the plurality of extraction pipes assembled with one of the plurality of conversion units;

an extraction amplification module, comprising an extraction amplification bearing unit, a plurality of centrifuge tube bearing units, a plurality of first temperature control units, and a first cover unit, wherein the extraction amplification bearing unit is provided with the plurality of first temperature control units and the first cover unit adjacent to one of the plurality of first temperature control units;

a second movable module, assembled on a peripheral of the extraction amplification bearing unit, comprising a fourth movable unit and a clamping unit assembled with the fourth movable unit, wherein the fourth movable unit is located on a lower side of the extraction amplification bearing unit and comprises a fourth driver and a guide provided for sliding on the fourth driver, and the fourth driver is assembled with the clamping unit to clamp one of the plurality of centrifuge tube bearing units and move to a corresponding first temperature control unit;

a chromogenic and image interception module, comprising a plurality of shaking bearing units, a plurality of shaking driving units, a second cover unit, an image interception unit, and a plurality of reaction boxes, wherein the plurality of driving units are assembled with one side of the plurality of shaking bearing units, and the plurality of shaking driving units control one side of the plurality of shaking bearing units to shake side-to-side; each of the plurality of shaking bearing units is recessed along an axial direction thereof to form a plurality of shaking bearing grooves, the plurality of bearing grooves are accommodated in the plurality of reaction boxes, the second cover unit and the image interception unit are respectively arranged at one side of the plurality of shaking bearing units, wherein the image interception unit comprises a fifth driver and an image sensor assembled with the fifth driver, and the fifth driver controls movement of the image sensor in the first direction, the second direction and the third direction;

a rejection unit, adjacent to the extraction amplification module, comprising a stop plate, a plurality of stop grooves formed on the stop plate and a collector arranged on the lower side of the stop plate;

a storage unit, adjacent to the rejection unit, comprising a plurality of storage grooves, wherein the storage unit comprises a plurality of storage grooves with different sizes; and a processing module, electrically connected to the first movable module, the first cover unit, the plurality of extraction units, the extraction amplification module, the plurality of first temperature control units, the second movable module, and the second cover unit and the image interception unit of the chromogenic and image interception module, respectively;

wherein the processing module controls the first movable module to drive the multi-channel extraction module to move the biological samples to one of the extraction amplification module and the chromogenic and image interception module.

2. The one-station biomedical micro-laboratory system according to claim 1, wherein the first movable unit comprises at least one first guide rod and at least one first driver on the first direction, the second movable unit moves comprises at least one second guide rod and at least one second driver on the second direction, the third movable unit moves comprises at least one third guide rod and at least one third driver on the third direction, and the first driver, the second driver and the third driver are electrically connected to the processing module.

3. The one-station biomedical micro-laboratory system according to claim 1, wherein each of the plurality of conversion units further comprises a combination part, a channel part and a conversion part, one end of the combination part is assembled at one end of each of the plurality of extraction pipes opposite to an other end of the plurality of extraction pipes assembled with each of the plurality of extraction units, the conversion part connected to the combination part is tapered towards the other end of the combination part in an axial direction, and the channel part is disposed of passing through each of the plurality of conversion units from one end of the combination part connected to each of the plurality of extraction pipes to one end of the conversion part opposite to the other end.

4. The one-station biomedical micro-laboratory system according to claim 1, wherein each of the plurality of centrifuge tube bearing units comprises a plurality of bearing through holes, and each of the plurality of first temperature control units comprising a plurality of temperature control grooves, and when one of the plurality of centrifuge tube bearing units is arranged on one of the plurality of first temperature control units, the plurality of bearing through holes of each of the plurality of centrifuge tube bearing units respectively correspond to the plurality of temperature control grooves of one of the plurality of first temperature control units.

5. The one-station biomedical micro-laboratory system according to claim 1, wherein the clamping unit further comprises a clamping body, a clamping driver and two clamps, the clamping body and the clamping driver are respectively assembled on the guide, and the two clamps are provided for relatively sliding on each side of the clamping body.

6. The one-station biomedical micro-laboratory system according to claim 1, wherein each of the plurality of shaking bearing units comprises a temperature control unit, and at least one waste liquid collection unit is arranged below the temperature control unit.

7. A method for operating the one-station biomedical micro-laboratory system according to claim 1, comprising:

a setting inspection procedure, inputting an inspection procedure to be performed on collected sample into the processing module;

a pre-operation procedure, placing test reagents in centrifuge tubes accommodated in the plurality of storage grooves of the storage unit, respectively, and placing biochips in the plurality of reaction boxes, and placing the collected samples in corresponding centrifuge tubes;

an extraction procedure, controlling the multi-channel extraction module by the first movable module to move to a set centrifuge tube, and micropipettes assembled with the plurality of conversion units extracting the biological samples with required solution volume mixed with test reagents in the centrifuge tubes by the plurality of extraction pipes, placing the biological samples mixed with the test reagents in the centrifuge tubes accommodated by the plurality of centrifuge tube bearing units, and then controlling the clamping unit of the second movable module to respectively clamp the plurality of centrifuge tube bearing units to one of the plurality of first temperature control units, wherein the processing module moves the biological samples mixed with the test reagents in the centrifuge tubes sequentially between the plurality of first temperature control units with different temperatures;

a labeling procedure, adding a labeling reagent into the centrifuge tubes completed in the extraction procedure, mixing a labeling reagent with extracted samples, and moving the labeling reagent mixed with the extracted samples sequentially between the plurality of first temperature control units with different temperatures;

a chromogenic and interpretation procedure, driving the first movable module to control the multi-channel extraction module to move to the set centrifuge tube by the processing module, extracting the extracted samples completed in the labeling procedure with required solution volume in the set centrifuge tube by the micropipettes assembled with the plurality of conversion units by the plurality of extraction pipes, and transmitting the extracted samples completed in the labeling procedure to corresponding reaction boxes separately, and controlling the plurality of shaking driving units by the processing module to make the plurality of reaction boxes shake the plurality of shaking bearing units accommodated, reacting the biochips with the samples for chromogenic in the plurality of reaction boxes, controlling the fifth driver of the image interception module by the processing module to move the image sensor to sense, compare and interpret on chromogenic biochips one to one, and storing an interpretation result by the processing module;

wherein the processing module enables the one-station biomedical micro-laboratory system to perform the extraction procedure first and then the labeling procedure in sequence; and wherein the processing module enables the micropipettes assembled by the plurality of conversion units to be eliminated at the rejection unit.

8. The operation method according to claim 7, wherein the method comprises an amplification procedure after the extraction procedure that the processing module adds the test reagents containing a polymerase and a primer to the centrifuge tubes on the plurality of centrifuge tube bearing units which have completed an extraction, and sequentially moves the centrifuge tubes in which the test reagents mixed with the polymerase and the primer and the extracted samples are mixed between the first temperature control units with different temperatures, so that the samples completes an amplification.

9. The operation method according to claim 8, wherein the method comprises performing the amplification procedure by firstly adding the test reagent containing the polymerase to the centrifuge tube and then adding the test reagent containing the primer to the centrifuge tube.

10. The operation method according to according to claim 7, wherein one of the plurality of first temperature control units is further provided with a magnetic field unit; the centrifuge tubes accommodated on the plurality of centrifuge tube bearing units are filled with a test reagent containing magnetic beads; and the biological sample is extracted by the magnetic bead contained in the test reagent in the first temperature control unit containing the magnetic field unit during the extraction procedure.

* * * * *